United States Patent
Sugaya

(10) Patent No.: US 10,638,744 B2
(45) Date of Patent: May 5, 2020

(54) APPLICATION AND METHOD FOR CONTROLLING MOVING VEHICLE

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/313,186

(22) PCT Filed: Jun. 30, 2016

(86) PCT No.: PCT/JP2016/069507
§ 371 (c)(1),
(2) Date: Dec. 26, 2018

(87) PCT Pub. No.: WO2018/003082
PCT Pub. Date: Jan. 4, 2018

(65) Prior Publication Data
US 2019/0200600 A1    Jul. 4, 2019

(51) Int. Cl.
| | | |
|---|---|---|
| *A01M 25/00* | (2006.01) |
| *B64C 13/18* | (2006.01) |
| *B64D 1/16* | (2006.01) |
| *B64C 39/02* | (2006.01) |
| *A01M 7/00* | (2006.01) |
| *A01M 31/00* | (2006.01) |
| *B64D 1/18* | (2006.01) |
| *G05D 1/00* | (2006.01) |
| *G05D 1/10* | (2006.01) |
| *G06T 7/00* | (2017.01) |

(52) U.S. Cl.
CPC ............ *A01M 25/006* (2013.01); *A01M 7/00* (2013.01); *A01M 31/002* (2013.01); *B64C 13/18* (2013.01); *B64C 39/02* (2013.01); *B64C 39/024* (2013.01); *B64D 1/16* (2013.01); *B64D 1/18* (2013.01); *G05D 1/0038* (2013.01); *G05D 1/101* (2013.01); *G06T 7/0004* (2013.01); *B64C 2201/128* (2013.01); *G06T 2207/30188* (2013.01)

(58) Field of Classification Search
USPC .............................................. 701/2
See application file for complete search history.

(56) References Cited

U.S. PATENT DOCUMENTS

2006/0150470 A1 * 7/2006 Ronnau ................ A01M 1/026
                                                                43/58
2014/0303814 A1   10/2014 Burema et al.

FOREIGN PATENT DOCUMENTS

JP        11-235124      8/1999
JP        11-243829      9/1999
(Continued)

*Primary Examiner* — James M McPherson
(74) *Attorney, Agent, or Firm* — Lex IP Meister, PLLC

(57) ABSTRACT

The present invention is to provide an application and a method for controlling a moving vehicle that are capable to efficiently spray a chemical. The application for controlling a moving vehicle executed on an information terminal 100 mounted on the moving vehicle 10 acquires an image taken by the information terminal 100 in flight, analyzes the acquired image, detects a pest attached to a crop based on the result of the image analysis, acquires location information of the crop to which the detected pest is attached, and controls the moving vehicle 10 to spray a disinfestant based on the acquired location information.

8 Claims, 12 Drawing Sheets

(56) References Cited

FOREIGN PATENT DOCUMENTS

| | | |
|---|---|---|
| JP | 3836469 | 9/2005 |
| JP | 2015-228803 | 12/2015 |

\* cited by examiner

FIG.1
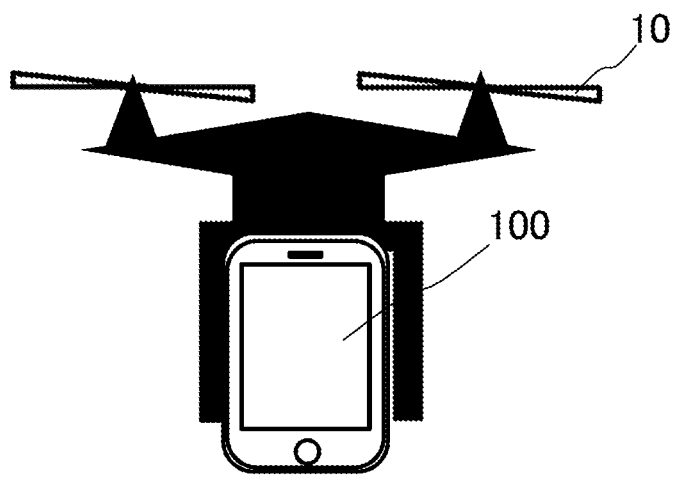
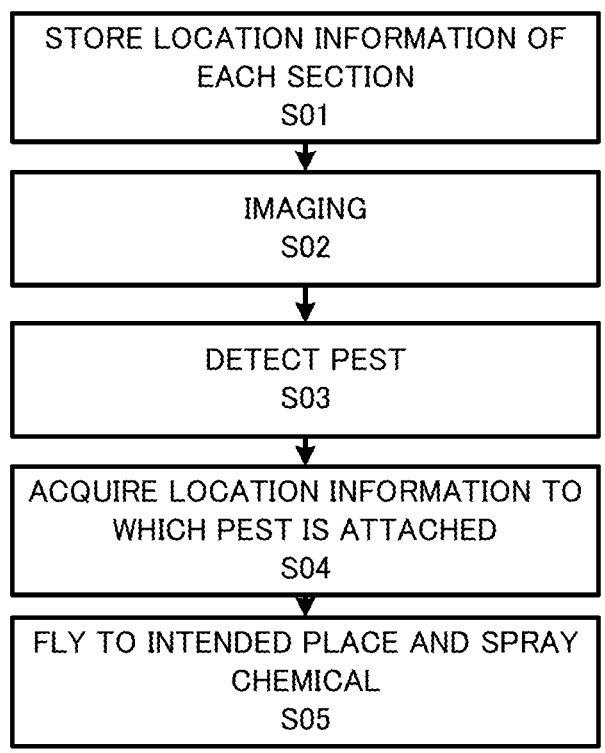
STORE LOCATION INFORMATION OF EACH SECTION
S01
IMAGING
S02
DETECT PEST
S03
ACQUIRE LOCATION INFORMATION TO WHICH PEST IS ATTACHED
S04
FLY TO INTENDED PLACE AND SPRAY CHEMICAL
S05

FIG.12

SECTION INFORMATION DB

| Imaging point | Coordinate |
|---|---|
| 1 | X1,Y1 |
| 2 | X1,Y3 |
| 3 | X1,Y5 |
| 4 | X1,Y7 |
| 5 | X3,Y7 |
| 6 | X5,Y7 |
| 7 | X7,Y7 |
| 8 | X9,Y7 |
| 9 | X9,Y5 |
| 10 | X9,Y3 |
| 11 | X9,Y1 |
| 12 | X7,Y1 |
| 13 | X7,Y3 |
| 14 | X7,Y5 |
| 15 | X5,Y5 |
| 16 | X3,Y5 |
| 17 | X3,Y3 |
| 18 | X5,Y3 |
| 19 | X5,Y1 |
| 20 | X3,Y1 |

APPLICATION AND METHOD FOR CONTROLLING MOVING VEHICLE

BACKGROUND

(a) Field

The present invention relates to an application and a method for controlling a moving vehicle that are executed on a terminal mounted on the moving vehicle.

(b) Description of the Related Art

Recently, the use of a moving vehicle such as a drone or a helicopter has been considered in various fields such as disaster relief, air photos, and agriculture, and such a moving vehicle has been put to practical use. For example, a crop-spraying device, an insect killer, etc., provided in a moving vehicle in agriculture has been considered to spray a chemical for pest control or disease control.

For example, the constitution in which a moving vehicle is provided with a tank storing a chemical, etc., from which the chemical is sprayed over farmland, is disclosed (refer to Patent Document 1).

CITATION LIST

Patent Literature

Patent Document 1: JP H11-243829 A

SUMMARY

However, the composition of Patent Document 1 sprays a chemical over the whole farmland, which sprays not only specific crops such as disease-affected and pest-infested crops but also disease-free and pest-free crops. Therefore, this is inefficient because a chemical is sprayed over unnecessary places.

An objective of the present invention is to provide an application and a method for controlling a moving vehicle that are capable to efficiently spray a chemical.

The first aspect of the present invention provides an application for controlling a moving vehicle, the application being executed on a terminal mounted on the moving vehicle, including:

an image acquisition unit that acquires an image taken by the terminal in flight;

an image analysis unit that analyzes the acquired image;

a pest detection unit that detects a pest attached to a crop based on the result of the image analysis;

a location information acquisition unit that acquires location information of the crop to which the detected pest is attached; and a moving vehicle control unit that controls the moving vehicle to spray a disinfestant based on the acquired location information.

According to the first aspect of the present invention, the application for controlling a moving vehicle, the application being executed on a terminal mounted on the moving vehicle acquires an image taken by the terminal in flight, analyzes the acquired image, detects a pest attached to a crop based on the result of the image analysis, acquires location information of the crop to which the detected pest is attached, and controls the moving vehicle to spray a disinfestant based on the acquired location information.

The first aspect of the present invention is related to the category of an application for controlling a moving vehicle, but another category e.g. a method category has similar functions and the effects according to its category.

The second aspect of the present invention provides the application according to the first aspect of the present invention, further including: a pest type detection unit that detects the type of the detected pest; and a spray control unit that controls the type or the amount of the disinfestant sprayed by the moving vehicle control unit based on the type of the detected pest.

According to the second aspect of the present invention, the application according to the first aspect of the present invention detects the type of the detected pest and controls the type or the amount of the disinfestant sprayed by the moving vehicle control unit based on the type of the detected pest.

The third aspect of the present invention provides the application according to the second aspect of the present invention, further including: a spray angle control unit that controls the angle to spray the disinfestant based on the type of the controlled disinfestant.

According to the third aspect of the present invention, the application according to the second aspect of the present invention controls the angle to spray the disinfestant based on the type of the controlled disinfestant.

The fourth aspect of the present invention provides the application according to the first aspect of the present invention, further including: an altitude detection unit that detects an altitude to which the detected pest is attached; and a spray angle control unit that controls an angle to spray the disinfestant based on the detected altitude.

According to the fourth aspect of the present invention, the application according to the first aspect of the present invention detects an altitude to which the detected pest is attached and controls an angle to spray the disinfestant based on the detected altitude.

The fifth aspect of the present invention provides the application according to the first aspect of the present invention, further including: a flight parameter detection unit that detects the flight parameter of the moving vehicle; and a spray angle control unit that controls an angle to spray the disinfestant based on the detected flight parameter.

According to the fifth aspect of the present invention, the application according to the first aspect of the present invention detects the flight parameter of the moving vehicle and controls an angle to spray the disinfestant based on the detected flight parameter.

The sixth aspect of the present invention provides the application according to the first aspect of the present invention, further including: a wind direction information acquisition unit that acquires wind information detected by a wind direction sensor; and a spray angle control unit that controls an angle to spray the disinfestant based on the acquired wind direction information.

According to the sixth aspect of the present invention, the application according to the first aspect of the present invention acquires wind information detected by a wind direction sensor and controls an angle to spray the disinfestant based on the acquired wind direction information.

The seventh aspect of the present invention provides the application according to the first aspect of the present invention, further including: a growth situation detection unit that detects the growth situation of a crop to which the detected pest is attached; and a spray control unit that controls the type or the amount of the disinfestant sprayed by the moving vehicle control unit based on the detected growth situation.

According to the seventh aspect of the present invention, the application according to the first aspect of the present invention detects the growth situation of a crop to which the detected pest is attached and controls the type or the amount of the disinfestant sprayed by the moving vehicle control unit based on the detected growth situation.

The eighth aspect of the present invention provides a method for controlling a moving vehicle, the method being executed on a terminal mounted on the moving vehicle, including the steps of:

acquiring an image taken by the terminal in flight;
analyzing the acquired image;
detecting a pest attached to a crop based on the result of the image analysis;
acquiring location information of the crop to which the detected pest is attached; and
controlling the moving vehicle to spray a disinfestant based on the acquired location information.

The present invention can provide an application and a method for controlling a moving vehicle that are capable to efficiently spray a chemical.

BRIEF DESCRIPTION OF THE DRAWINGS

FIG. 1 shows a schematic diagram of the system for controlling a moving vehicle 1.

FIG. 12 shows a section information database.

DETAILED DESCRIPTION OF THE EMBODIMENTS

Figure 2:
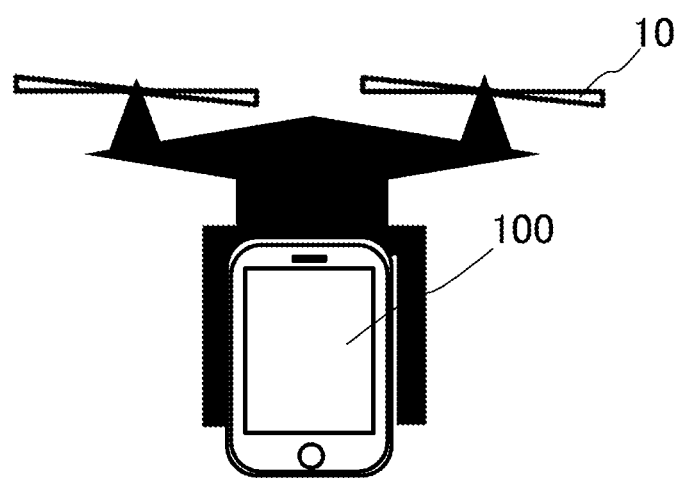
FIG. 2 shows an overall configuration diagram of the system for controlling a moving vehicle 1.

Embodiments of the present invention will be described below with reference to the attached drawings. However, this is illustrative only, and the technological scope of the present invention is not limited thereto.

Overview of System for Controlling a Moving Vehicle 1

A preferable embodiment of the present invention will be described below with reference to FIG. 1. FIG. 1 shows an overview of the system for controlling a moving vehicle 1 according to a preferable embodiment of the present invention. The system for controlling a moving vehicle 1 includes a moving vehicle 10 and an information terminal 100. In this embodiment, the moving vehicle control application executed on the information terminal 100 has the moving vehicle 10 or the information terminal 100 to perform the processes to be described later.

The moving vehicle 10 is an uninhabited airborne vehicle such as a drone that is connected with the information terminal 100 through, for example, wired connection such as USB connection or wireless connection and receives operation control from the moving vehicle control application running on this information terminal 100. The moving vehicle 10 is provided with various sensors such as a gyro sensor, an acceleration sensor, an altimeter, and a wind sensor, which transmits information detected by the various sensors to the information terminal 100. The moving vehicle 10 is also provided with a chemical storage storing a chemical such as a single or a plurality of disinfestants and agricultural chemicals. This chemical storage receives a control from the moving vehicle control application, such as a selection of the type or the amount of the chemical to be sprayed. For example, the chemical storage receives a control of, for example, the position and the angle of a nozzle from which the chemical is sprayed.

The information terminal 100 is a terminal device that is connected with the moving vehicle 10 through, for example, wired or wireless connection, which contains the moving vehicle control application that controls the operation of the moving vehicle 10. Examples of the information terminal 100 include electrical appliances such as a mobile phone, a mobile information terminal, a tablet terminal, a personal computer, a netbook terminal, a slate terminal, an electronic book terminal, and a portable music player.

The information terminal 100 receives the setting of a flight path, divides the flight path into a plurality of sections, and stores location information of the sections (Step S01). For example, the location information of the sections includes GPS coordinates. As the location information of the sections, location information on the center of each section is stored.

The moving vehicle 10 flies along the received flight path, and the information terminal 100 takes an image of each section (Step S02). The information terminal 100 takes one or more images of each section. The information terminal 100 associates and stores the image with the location information of the section of the image. The flight parameter such as the flight altitude, the flight speed, or the tilt of the moving vehicle 10 or the information on the external environment including a wind direction may be detected and stored. The information on the altitude of a crop that exists in the image may be acquired.

The moving vehicle 10 lands when the flight along the set flight path is ended. The information terminal 100 analyzes the image and detects a pest and a disease that are attached to a crop in the image (Step S03). For example, the information terminal 100 detects the pest, the disease, and the type, the growth situation, etc., of the crop by extracting the feature amount of the image.

The information terminal 100 acquires location information of the crop to which the detected pest is attached (Step 04). For example, the information terminal 100 acquires the location information associated with the image of the crop to which a pest is attached.

The moving vehicle 10 flies to the place of the location information that the information terminal 100 acquires and sprays a chemical (Step S05).

When a chemical is sprayed, the type or the amount of a chemical may be controlled based on the type of the detected pest. For example, the chemical a may be used for the detected pest A, or the chemical b may be used for the detected pest B.

The type or the amount of a chemical may also be controlled based on the growth situation of a crop. For example, if the crop has grown enough for shipment, the amount of a chemical to be used may be reduced, or a low-residual chemical may be used.

The angle to spray a chemical may be controlled based on the type of a chemical. For example, the spray angle may be controlled low for a chemical to exterminate a small pest, or the spray angle may be controlled high for a chemical to exterminate a large pest.

The angle to spray a chemical may also be controlled based on the flight parameter or the wind direction. For example, the spray angle may be controlled low for the high flight speed or the strong wind, or the spray angle may be controlled high for the high altitude.

System Configuration of System for Controlling a Moving Vehicle 1

A system configuration of the system for controlling a moving vehicle 1 according to a preferable embodiment will be described below with reference to FIG. 2. FIG. 2 shows a block diagram illustrating the system for controlling a moving vehicle 1 according to a preferable embodiment of the present invention. The system for controlling a moving vehicle 1 includes a moving vehicle 10 and an information terminal 100.

The moving vehicle 10 is an uninhabited airborne vehicle that has the functions to be described later.

The information terminal 100 is the above-mentioned terminal device with the functions to be described later. The moving vehicle control application executed on the information terminal 100 has the moving vehicle 10 or the information terminal 100 to perform the processes to be described later.

Functions

Figure 3:
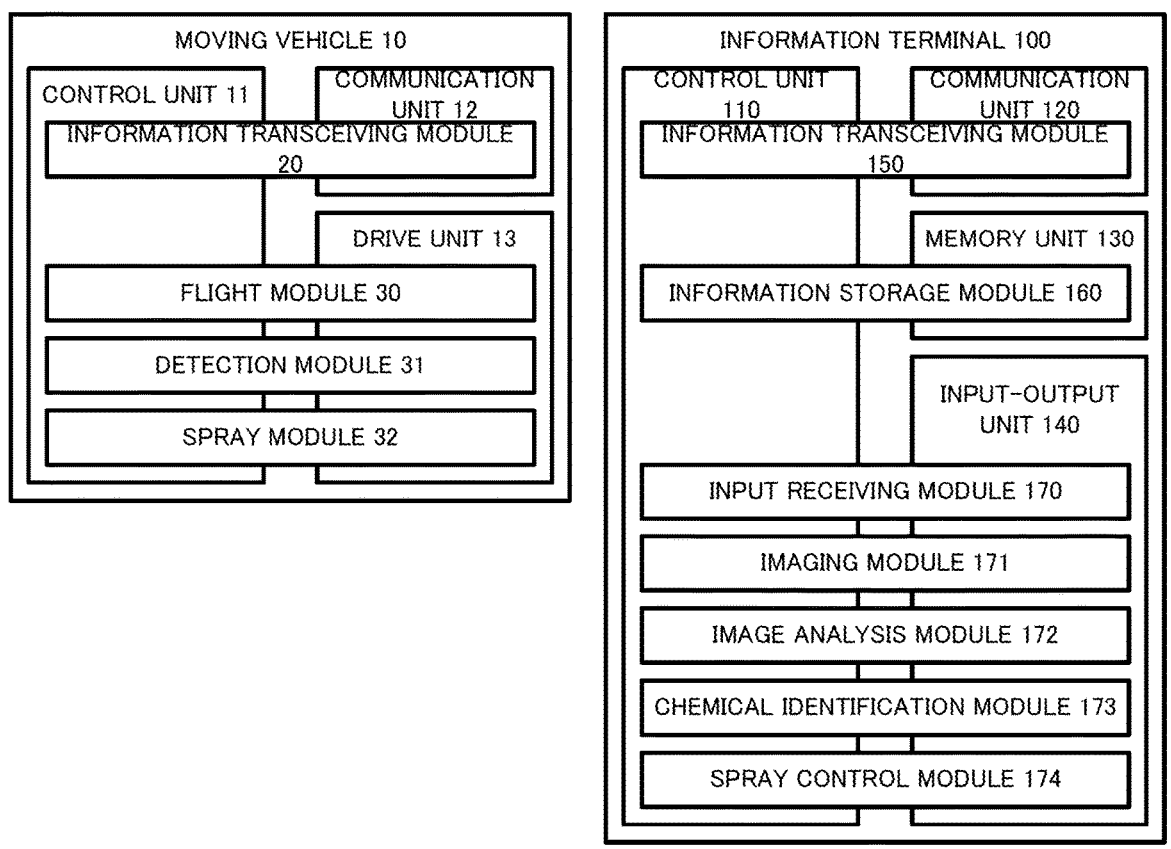
FIG. 3 shows a functional block diagram of the moving vehicle 10 and the information terminal 100.

The functions of the system for controlling a moving vehicle 1 according to a preferable embodiment will be described below with reference to FIG. 3. FIG. 3 shows a functional block diagram of the moving vehicle 10 and the information terminal 100.

The moving vehicle 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device that is capable to communicate with other devices, for example, a Wireless Fidelity or Wi-Fi® enabled device complying with IEEE 802.11 or a device with a capability of wired connection such as USB connection to communicate with other devices. The moving vehicle 10 also provided with a drive unit 13 including a flight device that drives the propeller to fly, a chemical spraying device that stores a chemical such as a disinfestant and an agricultural chemical and sprays the chemical, various sensors that detect the flight parameter such as the flight speed, the flight altitude, and the inclination and wind information on the wind direction in the external environment and from the propeller. For example, the chemical spraying device includes a storage that stores a chemical and a spray that sprays the chemical. The storage stores one or more chemicals. If two or more chemicals are stored, one chemical is selected from the chemicals based on the control from the moving vehicle control application. The spray is connected with the storage, which sprays a chemical to an intended crop or farmland. For example, the spray includes a hose and a nozzle, which is capable to receive a control from the moving vehicle control application and change the spray amount, the spray angle, etc., of a chemical.

In the moving vehicle 10, the control unit 11 reads a predetermined program to achieve an information transceiving module 20 in cooperation with the communication unit 12. Furthermore, in the moving vehicle 10, the control unit 11 reads a predetermined program to achieve a flight module 30, a detection module 31, and a spray module 32 in cooperation with the drive unit 13.

The information device 100 includes a control unit 110 including a CPU, a RAM, and a ROM; and a communication unit 120 such as a Wi-Fi® enabled device or a device with a capability of wired connection such as USB connection to communicate with other devices, in the same way as the moving vehicle 10. The information terminal 100 also includes a memory unit 130 such as a hard disk, a semiconductor memory, a record medium, or a memory card to store data. The information terminal 100 also includes an input-output unit 140 including a display unit outputting and displaying data and images that have been processed by the control unit 110; and an input unit such as a touch panel, a keyboard, or a mouse that receives an input from the user. The information terminal 100 also includes a location information acquisition device that acquires its own location information from a GPS, etc., an imaging device that takes an image, and an analysis device that analyzes the image.

In the information terminal 100, the control unit 110 reads a predetermined program to achieve an information transceiving module 150 in cooperation with the communication unit 120. In the information terminal 100, the control unit 110 reads a predetermined program to achieve an information storage module 160 in cooperation with the memory unit 130. Furthermore, in the information terminal 100, the control unit 110 reads a predetermined program to achieve an input receiving module 170, an imaging module 171, an image analysis module 172, a chemical identification module 173, and a spray control module 174 in cooperation with the input-output unit 140.

Imaging Process

Figure 4:
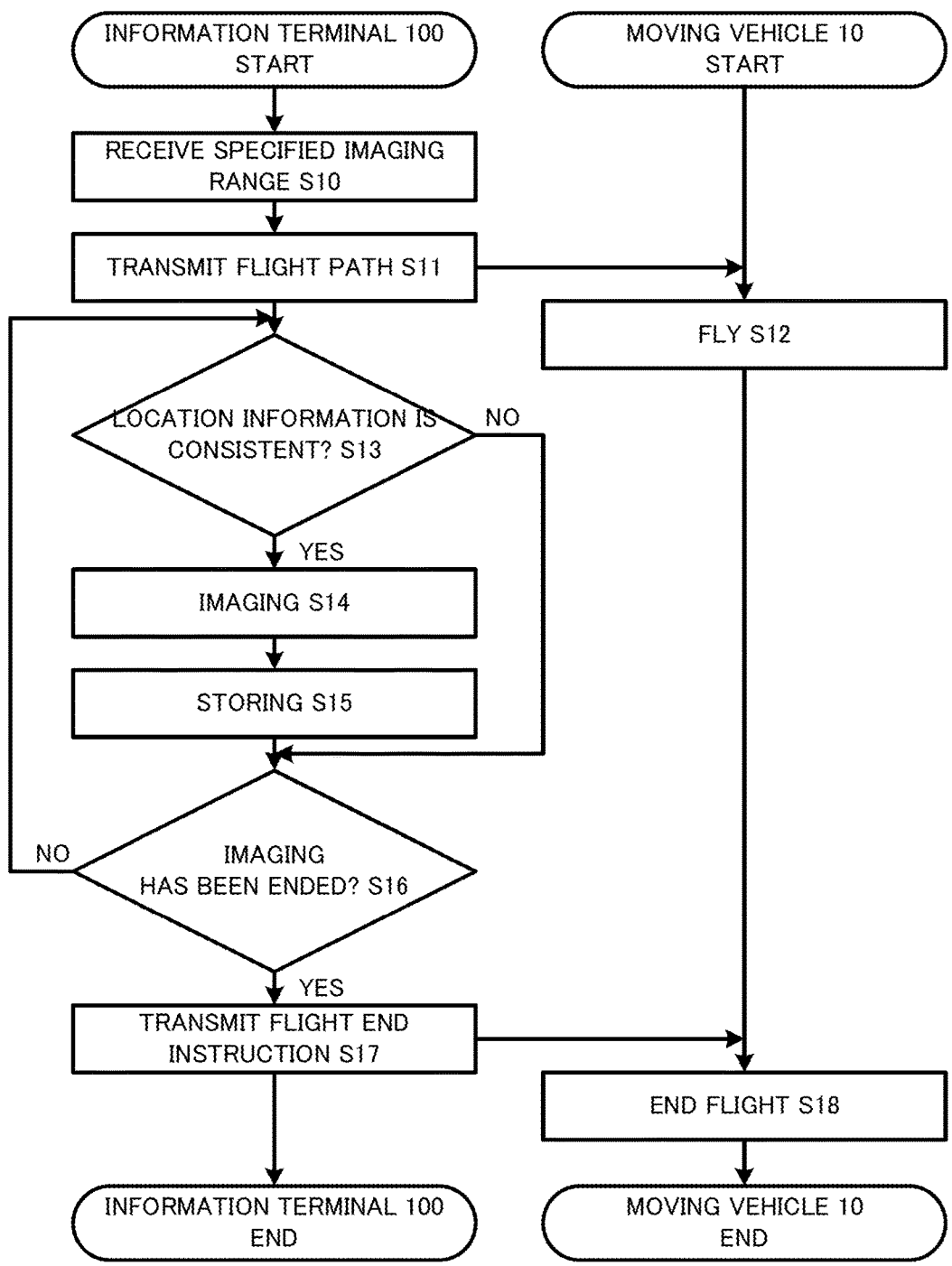
FIG. 4 shows the imaging process that the moving vehicle 10 and the information terminal 100 perform.

The imaging process performed by the system for controlling a moving vehicle 1 will be described below with reference to FIG. 4. FIG. 4 shows a flow chart of the imaging process that the moving vehicle 10 and the information terminal 100 perform. The tasks executed by the modules of each of the above-mentioned devices will be explained below together with this process. The moving vehicle control application executed on the information terminal 100 has the modules to perform the process described below.

The input receiving module 170 receives a specification of the imaging range of an intended farmland (Step S10). In the step S10, for example, the input receiving module 170 acquires map data, etc., from an external server, DB, etc., displays the map data on the display unit of the information terminal 100, and receives a specification of the imaging range on the map data.

Figure 8:
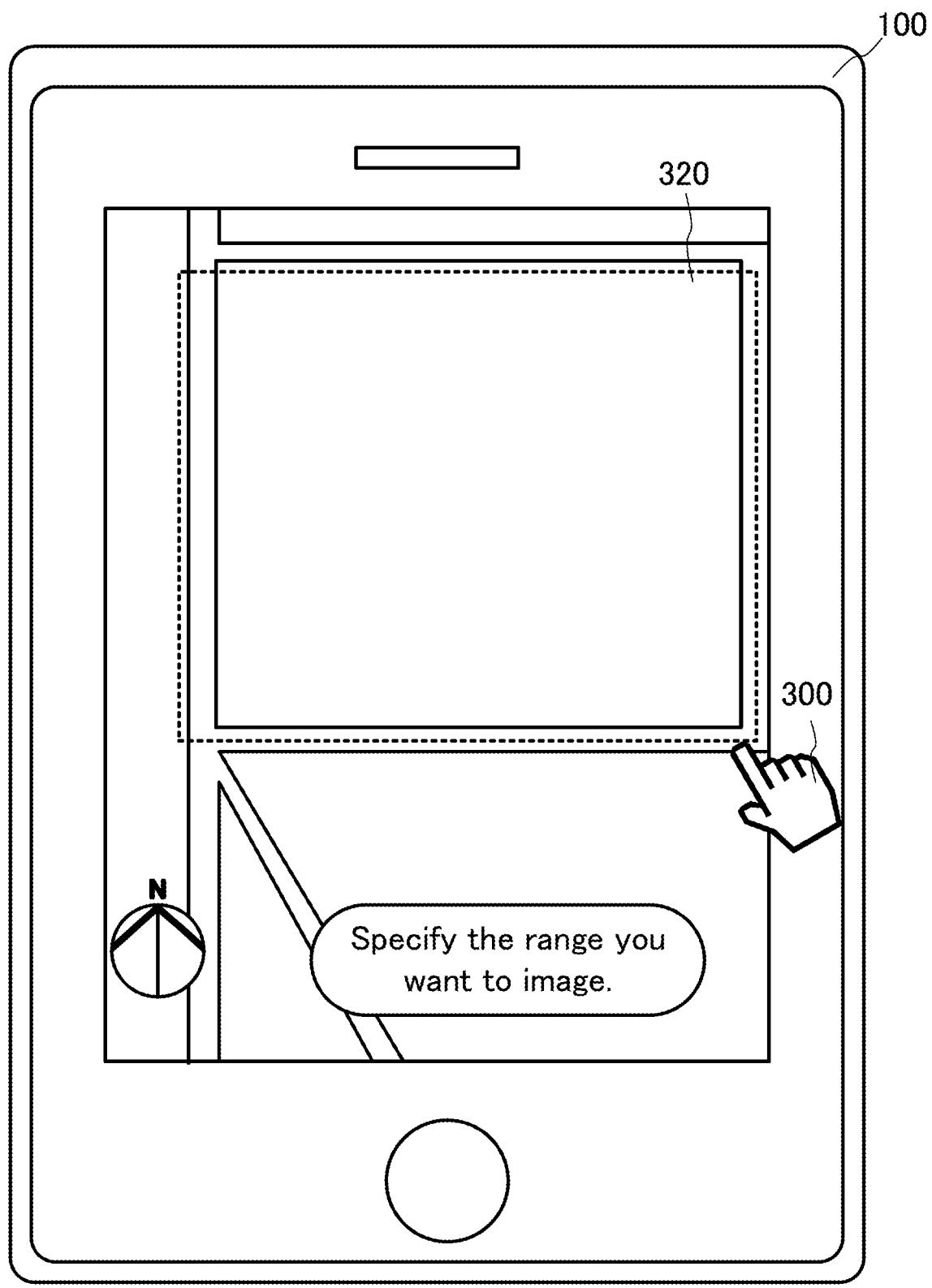
FIG. 8 shows a diagram illustrating an example where the information terminal 100 receives a specification of an imaging range.
Figure 9:
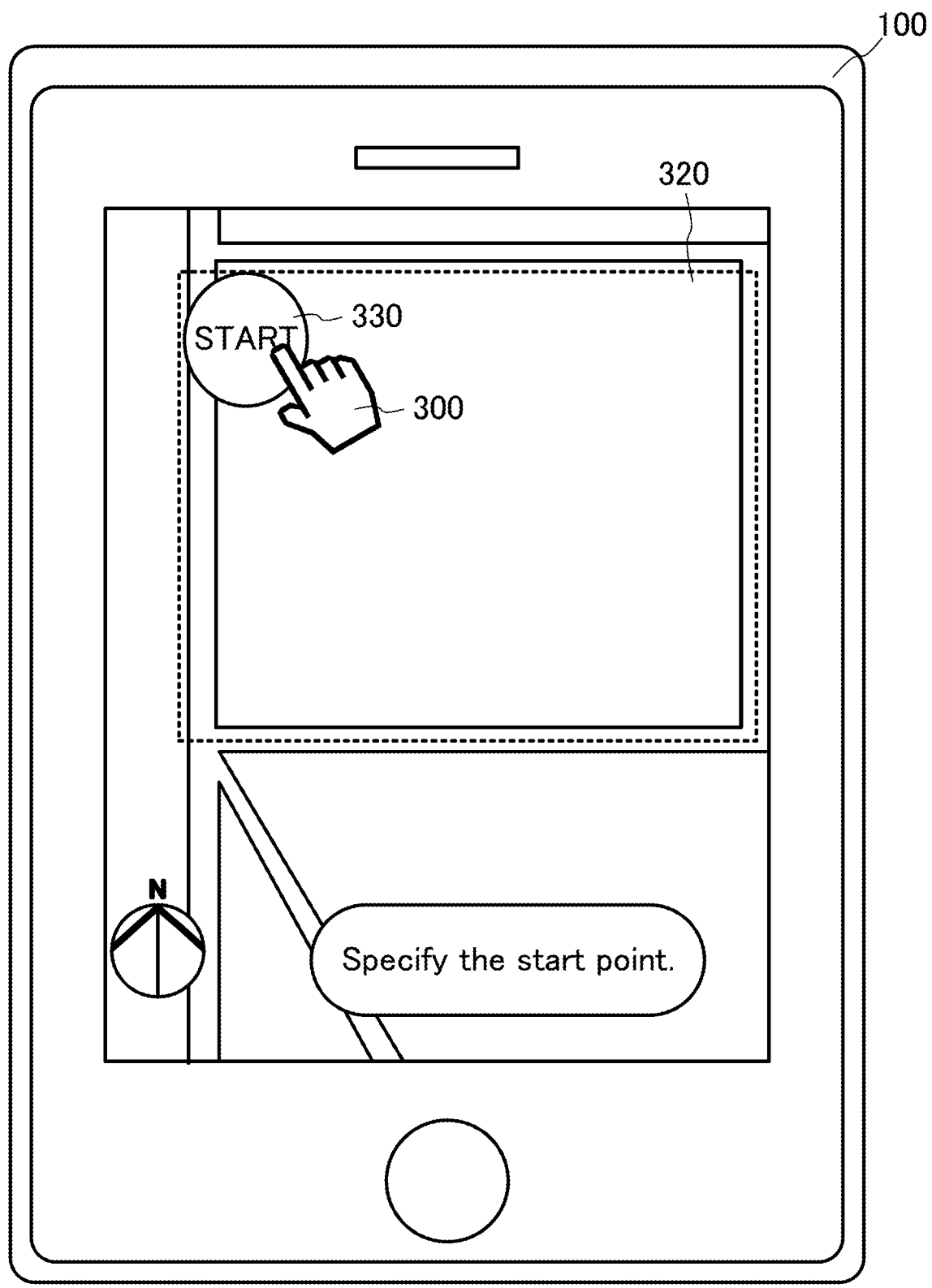
FIG. 9 shows a diagram illustrating an example where the information terminal 100 receives a registration of a start point.
Figure 10:
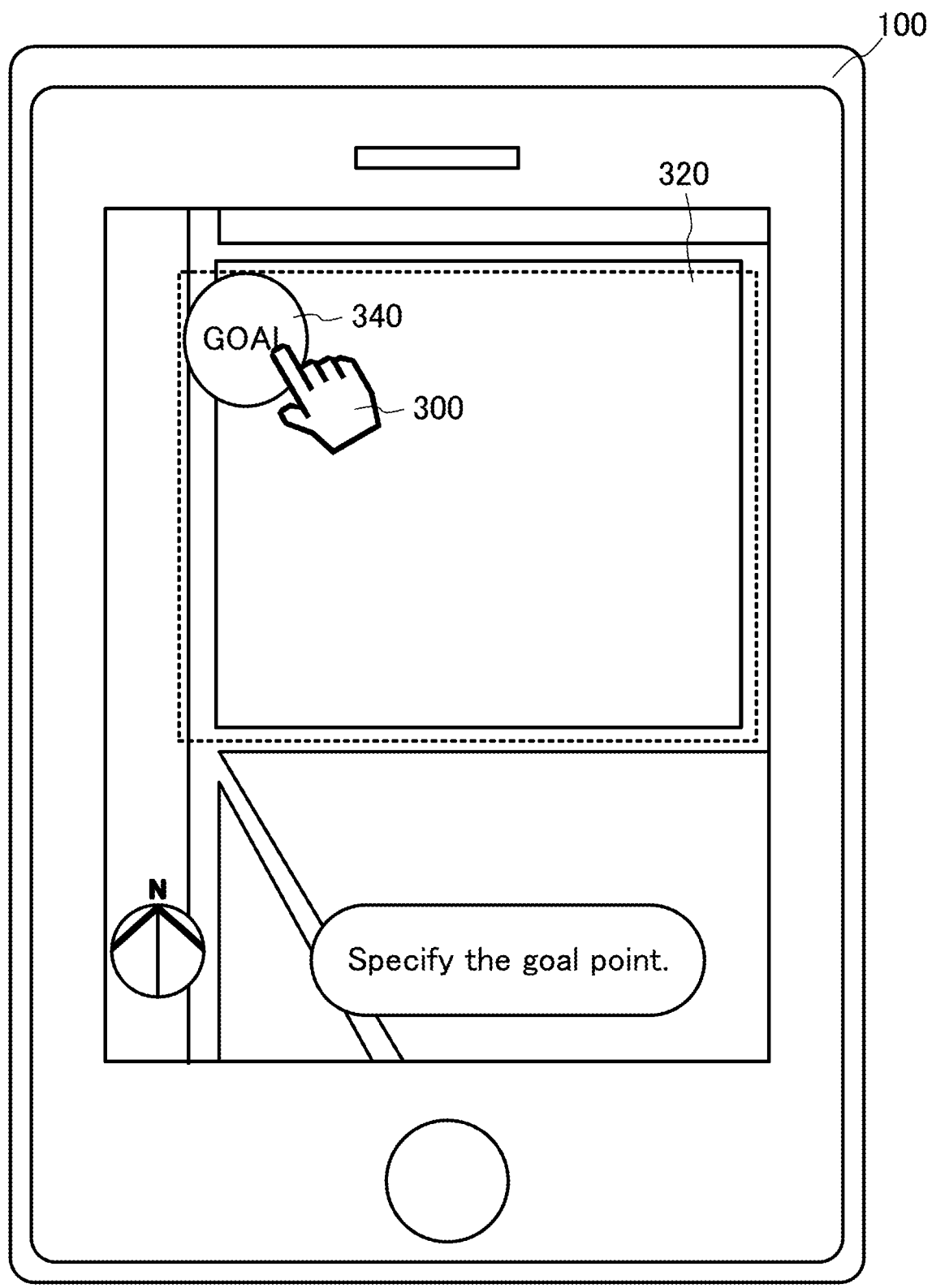
FIG. 10 shows a diagram illustrating an example where the information terminal 100 receives a registration of a goal point.

FIGS. 8, 9, and 10 show a diagram illustrating a specification of the imaging range that the input receiving module 170 receives.

FIG. 8 shows a diagram illustrating an example where the input receiving module 170 receives a specification of an imaging range. In FIG. 8, the input receiving module 170 receives a specification of the imaging range by performing an operation to enclose a predetermined range on the map data. The input receiving module 170 receives a tap operation from the user 300 and sets the imaging range 320 indicating the specified range on a map.

FIG. 9 shows a diagram illustrating an example where the input receiving module 170 receives a registration of a start point. In FIG. 9, the input receiving module 170 receives an input of a start point from the user 300 in the imaging range 320 and displays a start icon 330 showing the received start point in the imaging range 320. For example, the input receiving module 170 receives an input of the start point by receiving a tap operation.

FIG. 10 shows a diagram illustrating an example where the input receiving module 170 receives a registration of a goal point. In FIG. 10, the input receiving module 170 receives an input of a goal point from the user 300 in the imaging range 320 and displays a goal icon 340 showing the received goal point in the imaging range 320. For example, the input receiving module 170 receives an input of the goal point by receiving a tap operation.

Figure 11:
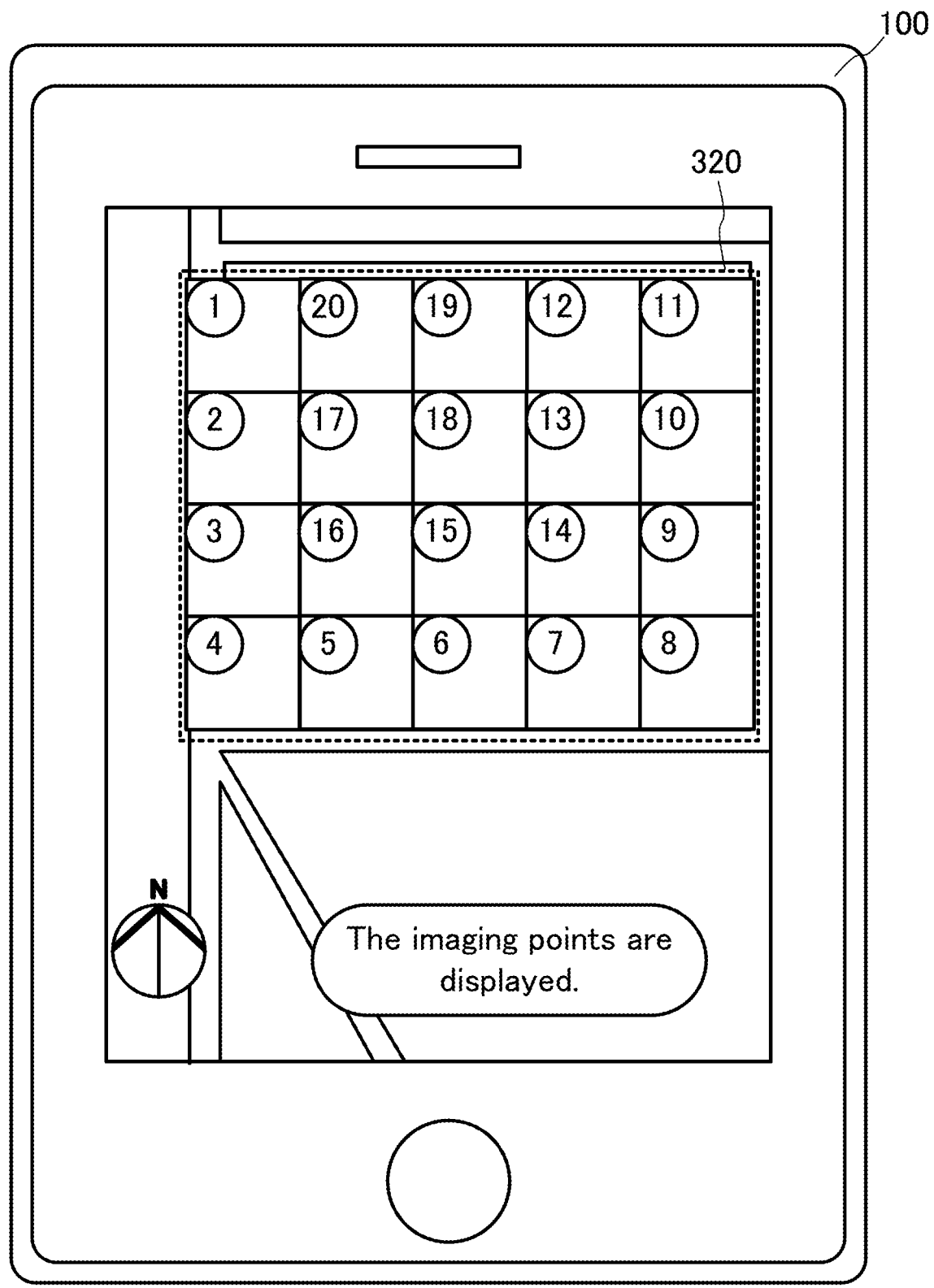
FIG. 11 shows a diagram illustrating an example of the imaging order that the information terminal 100 displays.

FIG. 11 shows a diagram illustrating an example of the imaging order that the input receiving module 170 displays. In FIG. 11, the input receiving module 170 is sets the flight path based on the start point and the goal point that have been input and generates a plurality of sections, each of which has a predetermined range. In FIG. 11, the imaging range 320 is divided into 20 sections to which the numbers 1 to 20 are assigned. The imaging module 171 takes the image of each of the 20 sections. The imaging module 171 takes the images in order of the assigned numbers, respectively. The information storage module 160 creates a section information database in which location information of each section is associated with the section name. The location information of a section indicates the center of this section.

The specification of the imaging range that the input receiving module 170 receives is not limited to the above-mentioned examples and may be others. The flight path that the input receiving module 170 sets is not limited to the above-mentioned examples and may be others. The number and the order of the sections that the input receiving module 170 sets is not limited to the above-mentioned examples and may be others.

Section Information Database

FIG. 12 shows the section information database stored in the information storage module 160. In FIG. 12, the information storage module 160 is associated and stored with an imaging point and a coordinate. The imaging point indicates each of the above-mentioned sections. The coordinate indicates the location information of each section. The information storage module 160 associates and stores all sections with location information.

The location information that the information storage module 160 stores is not limited to a coordinate and may be a latitude and longitude, GPS information, etc. The location information of each section is also not limited to a center position and may be other positions.

The flight path may not be input from the input receiving module 170 and may be determined based on a previously set predetermined route, etc.

The information transceiving module 150 transmits the set flight path to the moving vehicle 10 (Step S11).

The information transceiving module 20 receives the flight path. The flight module 30 flies over a farmland based on the flight path (Step S12).

The imaging module 171 judges whether or not the location information of the information terminal 100 is consistent with the location information of a stored section (Step S13). If the location information of the information terminal 100 is not consistent with the location information of a stored section (NO) in the step S13, the imaging module 171 performs the step S16 to be described later.

On the other hand, if the location information of the information terminal 100 is consistent with the location information of a stored section (YES) in the step S13, the imaging module 171 images this section. In the step S14, the imaging module 171 images a crop contained in the section.

The information storage module 160 associates and stores the image with the location information (Step S15).

The imaging module 171 judges whether or not all the sections have been imaged (Step S16). In the step S16, the imaging module 171 judges whether or not all the sections have been imaged based on, for example, whether or not the imaging module 171 has imaged all the sections set along the flight path or whether or not the information storage module 160 has associated the images with location information of all the sections. If judging that all the sections have not been imaged (NO) in the step S16, the imaging module 171 performs the above-mentioned step S13.

On the other hand, if the imaging module 171 judges that all the sections have been imaged (YES) in the step S16, the information transceiving module 150 transmits a flight end instruction to the moving vehicle 10 (Step S17).

The information transceiving module 20 receives the flight end instruction. The flight module 30 ends to fly (Step S18). In the step S18, the flight module 30 may stop the drive of the propeller and land, or may stop in the air.

In the imaging process, a plurality of images may be taken for one section. The area of one set section can be appropriately changed.

Image Analysis Process

Figure 5:
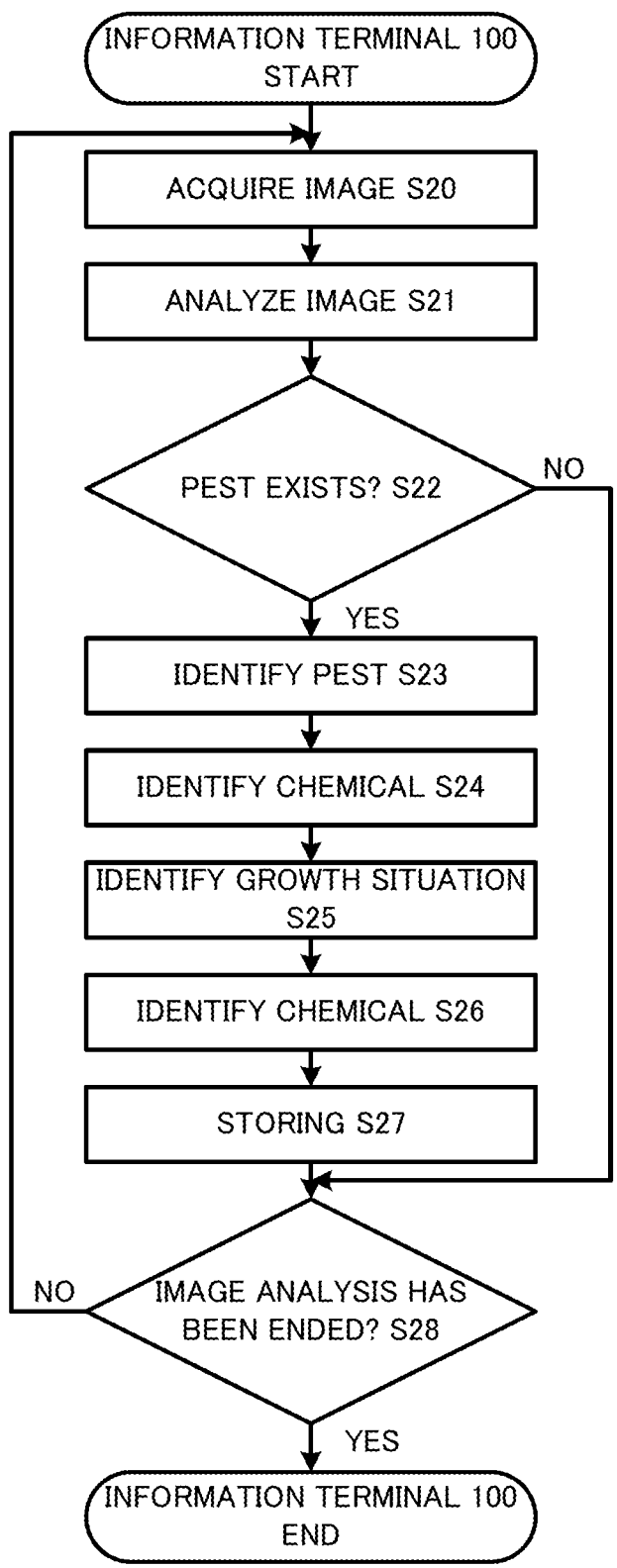
FIG. 5 shows an image analysis process that the information terminal 100 performs.

The image analysis process performed by the system for controlling a moving vehicle 1 will be described below with reference to FIG. 5. FIG. 5 shows a flow chart of the image analysis process performed by the information terminal 100. The tasks executed by the modules will be described below with this process. The moving vehicle control application executed on the information terminal 100 has the modules to perform the process described below.

The image analysis module 172 acquires the image taken during a flight that the information storage module 160 stores (Step S20). In the step S20, the image analysis module 172 may acquire all the images or one of the images.

The image analysis module 172 analyzes the acquired image (Step S21). In the step S21, the image analysis module 172 extracts the feature amount of the image and detects the presence or absence of a pest, the type of the pest, the altitude to which the pest is attached, the type of the crop, and the growth situation of the crop and if a pest exists. For example, the image analysis module 172 identifies the pest, the crop, etc., that has the feature amount extracted from the image based on an external server, a database, etc., and analyzes the type of the pest, the type of the crop, the growth situation of the crop, etc.

The image analysis module 172 judges whether or not a pest exists in the image based on the result of the image analysis (Step S22). If judging that a pest does not exist (NO) in the step S22, the image analysis module 172 performs the step S28 to be described later.

On the other hand, if judging that a pest exists (YES) in the step S22, the image analysis module 172 identifies the number and the type of the pests. In the step S23, the image analysis module 172 identifies the pest by acquiring various pest information including the number, the type, and the name of the pests, the chemical for the pests based on an external server, a database, etc. In the step S23, the image analysis module 172 detects the altitude of the place to which the pest is attached in addition to the type of the pest that is described above.

The chemical identification module 173 identifies the type and the amount of the chemical for the number and the type of the identified pests (Step S24). In the step S24, for example, if the number of pests is five, the chemical identification module 173 identifies the amount of the chemical to be increased more than the amount for one pest. Moreover, if the type of the pest is the type A, the chemical identification module 173 identifies the type and the amount of the chemical by acquiring information on the chemical that can exterminate the type A from an external server, a database, etc. In the step S24, the chemical identification module 173 may identify either the type or the amount of the chemical.

The image analysis module 172 identifies the growth situation of a crop (Step S25). In the step S25, the image analysis module 172 identifies the growth situation of a crop by acquiring various crop information including the type of the crop and the growth situation of the crop based on an external server, a database, etc.

The chemical identification module 173 identifies the type and the amount of the chemical based on the growth situation of the identified crop (Step S26). In the step S26, for example, if the growth situation is near to shipment, the chemical identification module 173 identifies the amount of the chemical that is decreased than usual or the type of the chemical that is less potent. On the other hand, if the growth situation is an early stage, the chemical identification module 173 identifies the usual amount of the chemical or the type of the chemical that is more potent. In the step S26, the chemical identification module 173 may identify either the type or the amount of the chemical.

The information storage module 160 associates and stores the number and the type of the identified pests, the altitude to which the pests are attached, the growth situation of the crop, the image, the location information of the image, the type and the amount of the chemical for the pest, and the type and the amount of the chemical based on the growth situation (Step S27).

The information storage module 160 may associate and store the number and the type of the identified pests, the growth situation of the crop, and the location information of the image. The data to be stored may be appropriately changed.

The image analysis module 172 judges whether or not all the images have been analyzed (Step S28). In the step S28, the image analysis module 172 judges whether or not all the images have been analyzed based on whether or not the images of all the sections have been analyzed. If judging that all the images have not been analyzed (NO) in the step S28, the image analysis module 172 performs the above-mentioned step S20.

If judging that all the images have been analyzed (YES) in the step S28, the image analysis module 172 ends this process.

The image of a pest, a withered leaf, etc., may be previously associated and stored with the type of a chemical to be sprayed in the information terminal 100, a pest, a withered leaf, etc., contained in an image may be extracted by image analysis, and the type of the chemical associated with the extracted pest or the withered leaf may be acquired.

Spray Process

Figure 6:
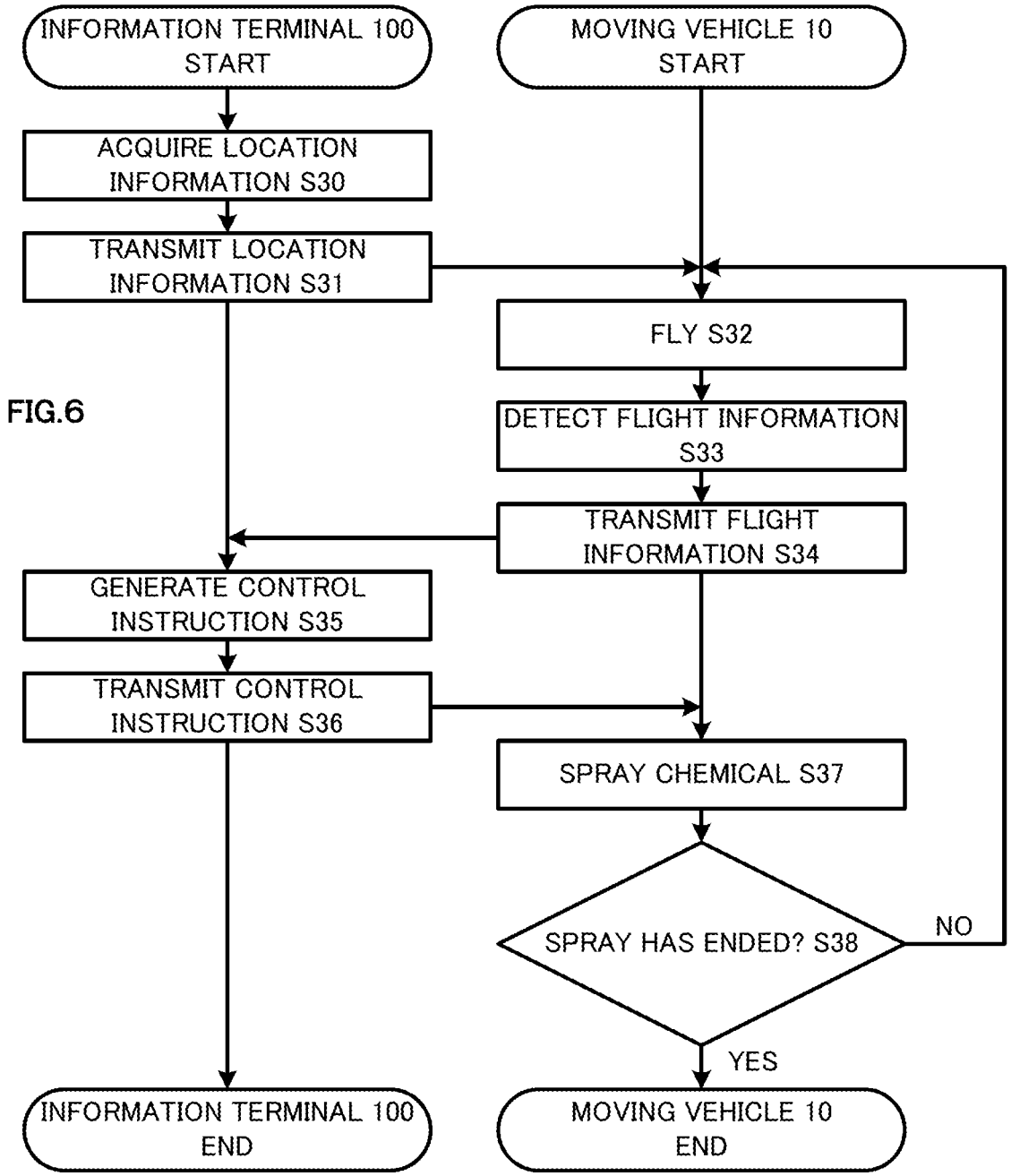
FIG. 6 shows a spray process that the moving vehicle 10 and the information terminal 100 perform.

The spray process performed by the system for controlling a moving vehicle 1 will be described below with reference to FIG. 6. FIG. 6 shows a flow chart of the spray process that the moving vehicle 10 and the information terminal 100 perform. The tasks executed by the modules of each of the above-mentioned devices will be explained below together with this process. The moving vehicle control application executed on the information terminal 100 has the modules to perform the process described below.

The information storage module 160 acquires the location information with which the type of the pest is associated (Step S30). In the step S30, the information storage module 160 acquires the location information with which the type of the pest is associated based on the imaging order of the images input in the imaging process. In the step S30, one or all kinds of the location information with which the type of the pest is associated may be acquired The information transceiving module 150 transmits the acquired location information to the moving vehicle 10 (Step S31).

The information transceiving module 20 receives the location information. The flight module 30 flies to the place indicated from the intended location information based on the received location information (Step S32).

The detection module 31 detects flight information including flight parameters such as the flight altitude, the flight speed, and the inclination of the moving vehicle 10 and wind direction information including the influence of the wind from the external environment and the propeller. (Step S33).

The information transceiving module 20 transmits the detected flight information (Step S34).

The information transceiving module 150 receives the flight information. The spray control module 174 generates a control instruction to control the type, the amount, and the spray angle of the chemical based on the type and the amount of the chemical with which the location information is associated that the storage module 160 stores and the flight information (Step S35). In the step S35, for example, the spray control module 174 generates a control instruction to control the angle of the nozzle of the chemical based on the type of the chemical. The spray control module 174 also generates a control instruction to control the angle of the nozzle of the chemical based on the flight altitude or the flight speed of the moving vehicle 10. The spray control module 174 also generates a control instruction to control the angle of the nozzle of the chemical based on the wind direction. The spray control module 174 also generates a control instruction to control the angle of the nozzle of the chemical based on the altitude to which a pest is attached.

The information transceiving module 150 transmits the generated control information to the moving vehicle 10 (Step S36).

The information transceiving module 20 receives the control instruction. The spray module 32 selects a type of the chemical based on the control instruction, controls the amount of the chemical, and sprays the chemical based on the controlled angle of the nozzle (Step S37).

The spray module 32 judges whether or not spraying of the chemical has ended for all the location information (Step S38). In the step S38, for example, the moving vehicle 10 notifies the location information for which spraying of the chemical has ended, to the information terminal 100. If spraying of the chemical has ended for all the location information, the moving vehicle 10 receives a notification that spraying of the chemical has ended for all the location information, from the information terminal 100. If judging that spraying of the chemical has not ended for all the location information (NO) in the step S38, the spray module 32 performs the above-mentioned step S32.

On the other hand, if judging that spraying of the chemical has ended for all the location information (YES) in the step S38, the spray module 32 ends this process.

In the above-mentioned spray process, for example, if there are a large number of pests, the information terminal 100 controls the moving vehicle 10 to increase the chemical and spray it. The information terminal 100 also controls the moving vehicle 10 to change the amount of the chemical based on the type of the chemical and spray it.

The control of the angle of the nozzle is not limited to the above-mentioned examples and may be determined based on the acquired image.

Variations

Figure 7:
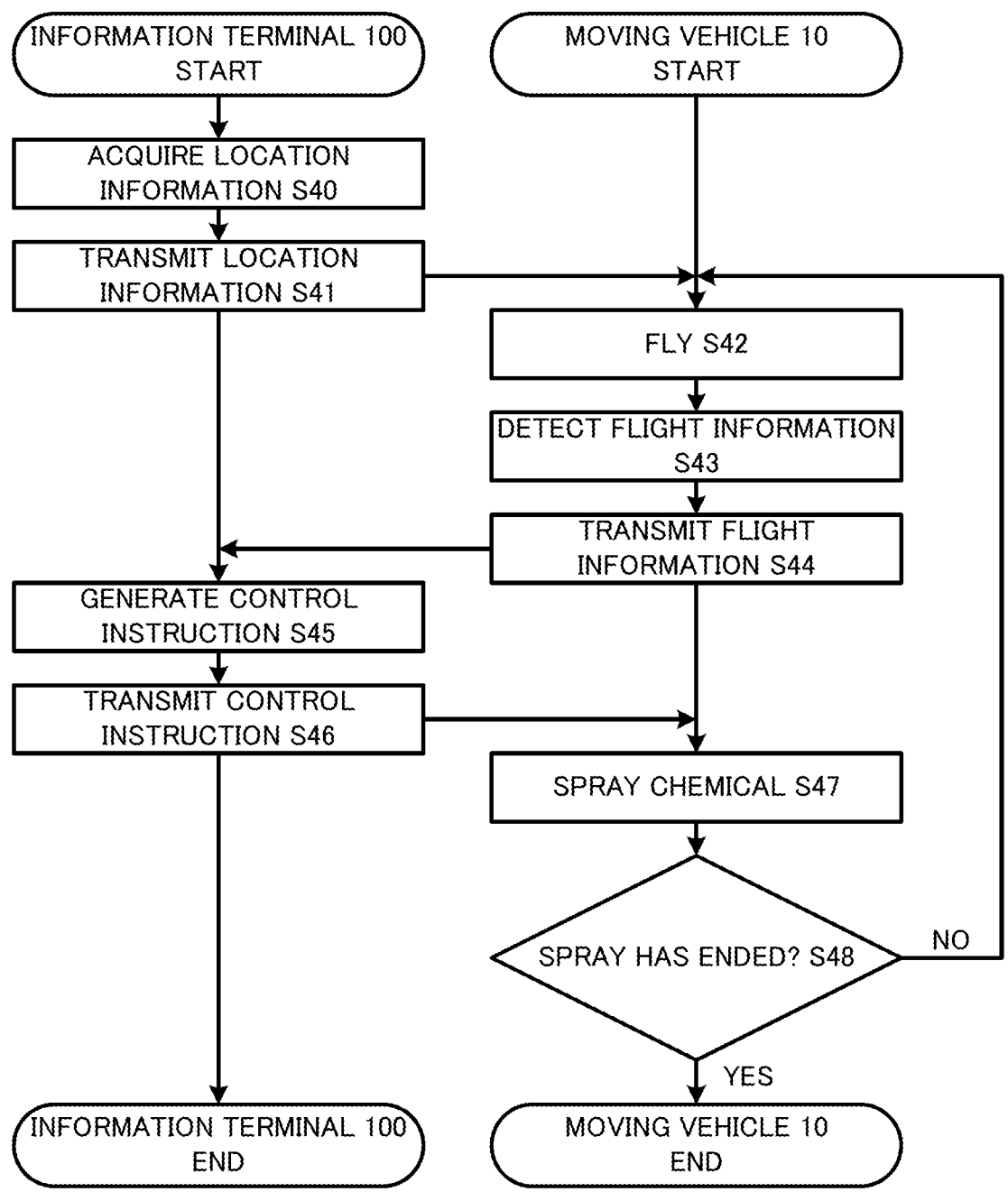
FIG. 7 shows a spray process according to a variation that the moving vehicle 10 and the information terminal 100 perform.

A variation of the spray process is described below. A variation of the spray process performed by the system for controlling a moving vehicle 1 will be described below with reference to FIG. 7. FIG. 7 shows the flow chart of a variation of the spray process that the moving vehicle 10 and the information terminal 100 perform. The tasks executed by the modules of each of the above-mentioned devices will be explained below together with this process. The moving vehicle control application executed on the information terminal 100 has the modules to perform the process described below. The reference signs in the variation are assigned to the same components as those of the above-mentioned spray process. The detailed explanation of the components is omitted.

The information storage module 160 acquires the location information with which the type of the pest and the growth situation of the crop are associated (Step S40). In the step S40, the information storage module 160 acquires the location information with which the type of the pest and the growth situation of the crop are associated based on the imaging order of the images input in the imaging process. In the step S40, one or all kinds of the location information with which the type of the pest and the growth situation of the crop are associated may be acquired.

The information transceiving module 150 transmits the acquired location information to the moving vehicle 10 (Step S41).

The information transceiving module 20 receives the location information. The flight module 30 flies to the place indicated from the intended location information based on the received location information (Step S42).

The detection module 31 detects flight information including flight parameters such as the flight altitude, the flight speed, and the inclination of the moving vehicle 10 and wind direction information including the influence of the wind from the external environment and the propeller. (Step S43).

The information transceiving module 20 transmits the detected flight information (Step S44).

The information transceiving module 150 receives the flight information. The spray control module 174 generates a control instruction to control the type, the amount, and the spray angle of the chemical based on the type and the amount of the chemical for the type and the number of the pests with which the location information is associated that the storage module 160 store, the type and the amount of the chemical for the growth situation of the crop, and the flight information (Step S45). In the step S45, the spray control module 174 controls the type and the amount of the chemical based on the shipment time of crops to which a pest to be exterminated is attached, the condition of a withered leaf, or the developing stage and then generates a control instruction to control the angle of the nozzle of the chemical based on the flight altitude or the flight speed of the moving vehicle 10. The spray control module 174 also controls the type and the amount of the chemical based on the growth situation of a crop and then generates a control instruction to control the angle of the nozzle of the chemical based on the wind direction. The spray control module 174 also controls the type and the amount of the chemical based on the growth situation of a crop and then generates a control instruction to control the angle of the nozzle of the chemical based on the altitude to which a pest is attached.

The information transceiving module 150 transmits the generated control information to the moving vehicle 10 (Step S46).

The information transceiving module 20 receives the control instruction. The spray module 32 selects a type of the chemical based on the control instruction, controls the amount of the chemical, and sprays the chemical. (Step S47).

The spray module 32 judges whether or not spraying of the chemical has ended for all the location information (Step S48). In the step S48, for example, the moving vehicle 10 notifies the location information for which spraying of the chemical has ended, to the information terminal 100. If spraying of the chemical has ended for all the location information, the moving vehicle 10 receives a notification that spraying of the chemical has ended for all the location information, from the information terminal 100. If judging that spraying of the chemical has not ended for all the location information, (NO) in the step S48, the spray module 42 performs the above-mentioned step S42.

On the other hand, if judging that spraying of the chemical has ended for all the location information (YES) in the step S48, the spray module 42 ends this process.

In the variation, the control of the angle of the nozzle is not limited to the above-mentioned examples and may be determined based on the acquired image.

In the imaging process, the image analysis process, and the spray process that are mentioned above, the number of flights are two or more. The number of flights is not necessary to two or more but may be one. For example, a certain section may be imaged, the image of this section may be analyzed, and then the spray process may be performed when necessary.

In the above-mentioned spray process, the angle of the nozzle may be controlled considering the additional characteristics (weight, viscosity, and specific gravity), etc., of the chemical. The chemical may be sprayed in, for example, mists or other states. The spray states may be appropriately changed. The information terminal 100 controls the moving vehicle 10 to change the amount of the chemical based on the type or the growth situation of the crop and spray it. The information terminal 100 increases the amount of the chemical if the shipping date of the crop is far and decreases the amount of the chemical if the shipping date of the crop is near and then controls the moving vehicle 10 to change the amount of the chemical and spray it.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

DESCRIPTION OF REFERENCE NUMBERS

1 System for controlling a moving vehicle
10 Moving vehicle
100 Information terminal

What is claimed is:

1. An application for controlling a moving vehicle, the application running on a terminal mounted on the moving vehicle and causing the terminal to execute:
   receiving a setting of a start point and a goal point on a flight path and sets an imaging order in flight based on the setting;
   acquiring an image in flight that is taken by the terminal based on the imaging order;
   analyzing the acquired image;
   detecting a pest attached to a crop based on a result of the image analysis;
   acquiring location information of the crop to which the detected pest is attached; and
   controlling the moving vehicle to spray a disinfestant based on the acquired location information.

2. The application according to claim 1, wherein the application causes the terminal to further execute detecting a type of the detected pest; and controlling a type or an amount of the disinfestant based on a type of the detected pest.

3. The application according to claim 2, wherein the application causes the terminal to further execute controlling an angle to spray the disinfestant based on the type of the disinfestant.

4. The application according to claim 1, wherein the application causes the terminal to further execute detecting an altitude to which the detected pest is attached; and controlling an angle to spray the disinfestant based on the altitude.

5. The application according to claim 1, wherein the application causes the terminal to further execute detecting a flight parameter of the moving vehicle; and controlling an angle to spray the disinfestant based on the flight parameter.

6. The application according to claim 1, wherein the application causes the terminal to further execute acquiring wind direction information detected by a wind direction sensor; and controlling an angle to spray the disinfestant based on the wind direction information.

7. The application according to claim 1, wherein the application causes the terminal to further execute detecting a growth situation of a crop to which the detected pest is attached; and controlling a type or an amount of the disinfestant based on the growth situation.

8. A method for controlling a moving vehicle, the method being executed by an application running on a terminal mounted on the moving vehicle, comprising the steps of:
   receiving a setting of a start point and a goal point on a flight path and setting an imaging order in flight based on the setting;
   acquiring an image in flight that is taken by the terminal based on the imaging order;
   analyzing the acquired image;
   detecting a pest attached to a crop based on a result of the image analysis;
   acquiring location information of the crop to which the detected pest is attached; and
   controlling the moving vehicle to spray a disinfestant based on the acquired location information.

* * * * *